United States Patent Office 2,718,636
Patented Sept. 20, 1955

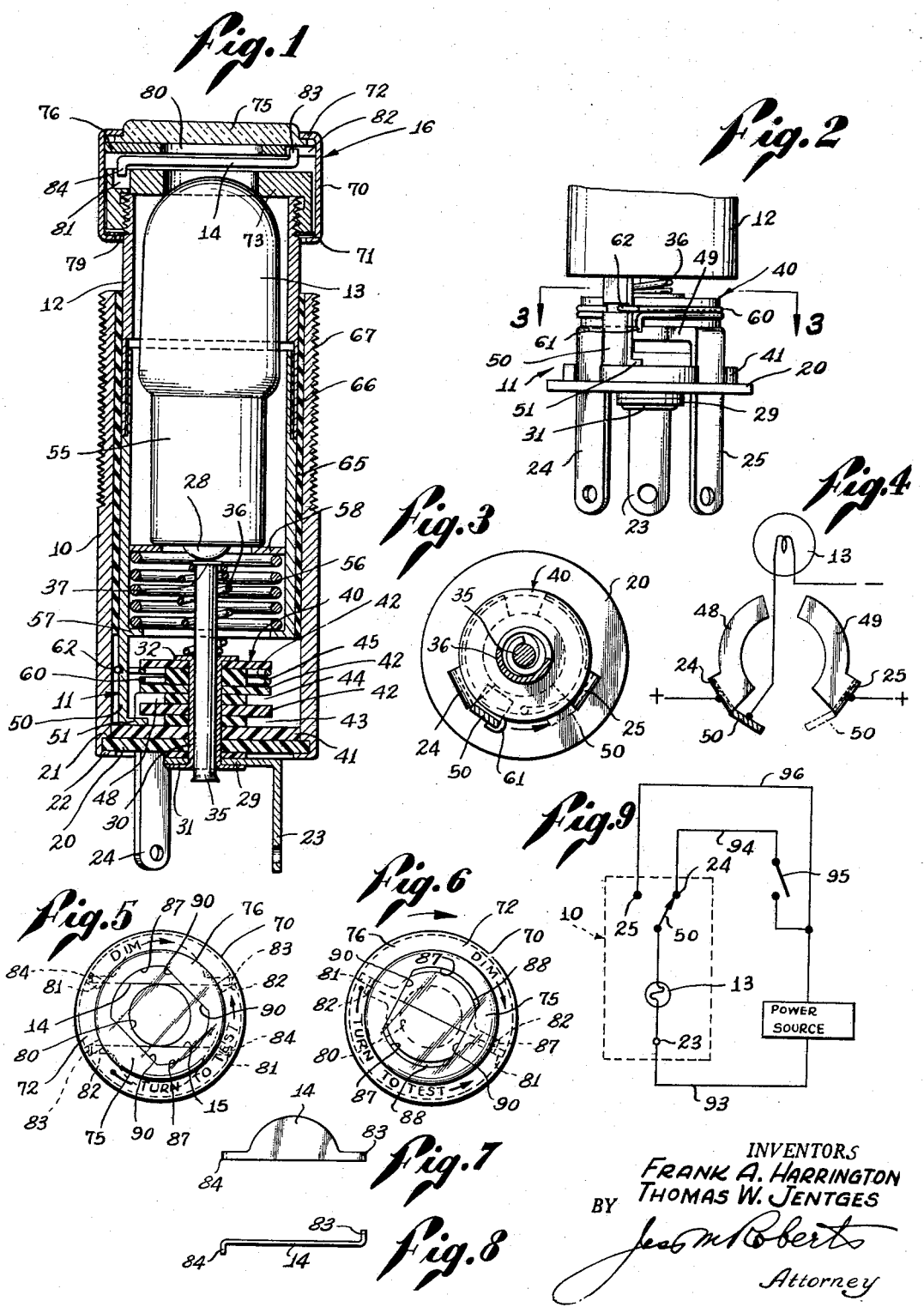

2,718,636

SELF-TESTING SIGNAL LIGHT

Frank A. Harrington, Brea, and Thomas W. Jentges, Santa Ana, Calif., assignors, by mesne assignments, to Marco Industries Company, Anaheim, Calif., a corporation of California Application April 27, 1953, Serial No. 351,172

14 Claims. (Cl. 340—381)

This invention relates to signal lights of the type used, for example, on the instrument panel of an aircraft to impart information to the pilot, and refers particularly to indicating lights of this kind that have built-in provisions for checking the operating condition of the light.

The Marco Patents 2,424,573 and 2,424,574 disclose signal lights of this character now in wide use for purposes such as to indicate when the landing wheels of an aircraft are lowered for a landing. The lamp bulb in the signal light is normally in the associated indicating circuit but may be connected into a separate test circuit by a built-in switch mechanism which is operated by finger pressure against the forward end of the signal light structure. For this purpose the signal light is made in two telescoping tubular sections with the retractable forward section normally held in extended position by a suitable spring.

Preferably a signal light of the Marco type is provided with a shutter such as disclosed in the Aves Patent 2,424,575, which shutter may be adjusted to control the emission of light. During daylight, maximum light emission is usually desirable but for operations at night, dimming is highly desirable. The shutter is adapted for adjustment by rotation of the forward end of the light structure. Thus the forward end of the light structure is longitudinally reciprocable for test purposes and, in addition, is rotatable for shutter adjustment.

The general object of the present invention is to afford certain advantages over prior signal lights of the type described.

One of the advantages to be attained may be understood from the fact that all of the light from the lamp bulb is released through a window or lens on the forward end of the light structure and it is this same forward end that is manually depressed for testing the lamp bulb. Thus the purpose of a test is defeated if the operator inadvertently completely masks the forward end of the light when he applies finger pressure to press inward on the light. In practice, of course, the operator will recognize the difficulty and make a new test after shifting his finger to unmask a portion of the signal light lens, but, nevertheless, the operator's attention is unnecessarily distracted and under the time limitations imposed by high speed flight, a fraction of a second in lost time may be a serious matter. In this regard a feature of the invention is the use of rotary movement for the test operation. The pilot merely turns the forward end of the signal light to connect the lamp to the test circuit and naturally grips the circumferential surface of the structure leaving the lens of the light unobstructed.

Another advantage to be sought is compactness of the structure of the signal light with emphasis on minimizing the extent to which the signal light structure projects forward from the instrument panel on which it is mounted. The use of rotational operating movement to make a test instead of longitudinal telescoping movement, makes it possible to provide this advantage in the signal light of the present invention.

These two advantages are achieved by a simple mechanical arrangement whereby the built-in switch mechanism is operated by rotation of the forward end of the signal light between two limit positions. A suitable spring exerts rotational force to hold the forward end of the light normally at one of the two limit positions to connect the lamp bulb with the associated indicating circuit, but the spring readily yields to permit rotation of the forward end of the light to the other limit position to connect the lamp bulb with a test circuit.

With reference to signal lights of this type that are equipped not only with a built-in test switch but also with a built-in adjustable shutter, another advantage to be attained is simplification by elimination of one of the two kinds of operating movement. The usual provision of both relative longitudinal movement and relative rotary movement between the telescoping sections of the light involves structural and mechanical complications that may be avoided by limiting the manual operation to only one of these movements. The present invention attains this end by using rotary movement to carry out both the test operation and the adjustment of the shutter. In this regard a feature of the invention is the concept of using successive ranges of rotary movement or "lost motion" between parts for different purposes. Thus in the preferred practice of the invention, one range of rotary movement is utilized for shutter adjustment, a second adjacent range of rotary movement is utilized for the test operation, and, as will be explained, a third range adjacent the second range is utilized to open up the structure for replacement of a lamp bulb whenever necessary.

A still further advantage to be sought is maximum brightness of the emitted light during the test procedure to avoid any doubt whatsoever about the results of the test. If the signal light is dimmed, there may be some doubt about the test and especially so if inadvertently the lamp is dimmed to maximum extent in the course of a test operation under bright daylight. A feature of the invention in this respect is the concept of having the range of rotation for shutter adjustment adjacent the range of rotation for testing, with the shutter wide open for maximum brightness at the initial end of the test range. With such an arrangement, the test operation cannot be initiated unless the shutter of the light is first adjusted for maximum brightness. Thus the invention makes the results of a test unmistakable, first, by avoiding any masking of the lens by the pilot, and, second by making it impossible to carry out the test with the light dimmed.

The objects, advantages and features of the invention may be readily understood from the following detailed description considered with the accompanying drawings.

In the drawings, which are to be regarded as merely illustrative:

Fig. 1 is an enlarged longitudinal sectional view of a signal or indicating light for aircraft use constructed in accord with the teachings of the invention;

Fig. 2 is a side elevation of the lower end of the signal light with the outer wall or housing removed;

Fig. 3 is a transverse section taken as indicated by the line 3—3 of Fig. 2;

Fig. 4 is a diagrammatic view illustrating the operation of the built-in switch;

Fig. 5 is a face view or end elevation of the signal light with the shutter open for maximum brightness;

Fig. 6 is a similar view with the shutter closed for minimum brightness;

Fig. 7 is a plan view of one of the two shutter members;

Fig. 8 is a side elevation or edge view of the shutter member; and

Fig. 9 is a wiring diagram of the signal light and the associated circuits.

The principal parts of the particular embodiment of the invention selected for this disclosure include: a cylindrical housing 10, a switch mechanism in the bottom end of the housing designated as a whole by numeral 11, a first cylindrical or hollow member 12 which is rotatably telescoped into the cylindrical housing 10 and which may be termed a lamp cylinder since it houses a lamp bulb 13; a shutter mechanism comprising a pair of shutter members 14 and 15 at the outer end of the lamp cylinder; and a second cylindrical or hollow member which may be in the form of a cap designated as a whole by numeral 16. The cap 16, which may be termed a rotary operating member, serves for manual operation of the moving parts and is operatively connected to the two shutter members 14 and 15.

The bottom of the cylindrical housing 10 is closed by a circular nonconducting wall member 20 which abuts a shoulder 21 of the housing and is secured by an inwardly turned flange 22 at the bottom of the housing. Projecting downward from the bottom of the cylindrical housing are a first terminal member 23 for connection with a power source, a second terminal member 24 for connection with a signal or indicating circuit, and a third terminal member 25 for connection with a test circuit.

The first terminal member 23 may be electrically connected with the center contact 28 at the base of the lamp bulb 13 in any suitable manner. In the construction shown, the first terminal member 23 is of angular configuration and has an apertured base portion 29 that is mounted on the lower end of a sleeve 30 of conducting material. The sleeve 30 has a flange 31 at its lower end for engagement with the first terminal member 23 and is formed with a second flange 32 at its upper end. A suitable plunger 35 of conducting material is slidably mounted in the sleeve 30 and is pressed upward into pressure engagement with the lamp contact 28 by means of a suitable coiled spring 36, the spring being in compression between the upper flange 32 of the sleeve and a flange 37 at the upper end of the plunger. The spring 36 may be conveniently referred to as the first spring of the device.

The built-in switch mechanism 11 may be of any construction suitable for carrying out the purpose of the invention. In the particular form shown in the drawings, the switch mechanism includes a cylindrical body of nonconducting material designated as a whole by numeral 40 which may take the form of a stack of apertured discs mounted on the previously mentioned sleeve 30 between the top flange 32 of the sleeve and the bottom wall member 20 of the light housing. The stack of discs which includes a bottom disc 41 of relatively large diameter and three spaced discs 42 of intermediate diameter forms three spaced circumferential grooves 43, 44 and 45.

The second terminal member 24 is of angular configuration and has an arcuate base portion 48 (Fig. 4) which is fixedly mounted in the middle circumferential groove 44 of the stack of discs and in like manner the third terminal member 25 is of angular configuration with an arcuate base portion 49 fixedly mounted in the same circumferential groove in spaced relation to the second terminal member. The switch mechanism 11 also includes a movable element or switch member 50 in the form of a leg that extends downward from the lamp cylinder 12 and is bent at its lower end to form a toe 51 that slidably engages the bottom groove 43 of the stack of discs 40. Preferably the switch member 50 is integral with the lamp cylinder 12.

The lamp bulb 13 has a second contact in the form of a base sleeve 55 which is electrically connected with the switch member 50 in a suitable manner. For this purpose a relatively large coiled spring 56 may be mounted inside the lamp cylinder 12 under compression between an inner annular shoulder or flange 57 of the lamp cylinder and a metal ring 58, the spring serving to press the metal ring upward against the base sleeve 55 of the lamp bulb. The spring 56 may aptly be termed the second spring of the device.

Normally, the switch member 50 abuts the side of the second terminal member 24 to form the following conducting path from the first terminal member 23 through the lamp 13 to the second terminal member 24: terminal member 23, sleeve 30, plunger 35, lamp bulb 13, metal ring 58, spring 56, lamp cylinder 12, switch member 50 and the second terminal member 24. When the switch member 50 is carried by rotation of the lamp sleeve 12 to the second limit position of the switch member shown in dotted lines in Figs. 3 and 4, the switch member 50 abuts the third terminal member 25 to place the first terminal member 23 in series with the third terminal member 25 through the lamp bulb 13 in the same manner.

Suitable yielding means is provided to urge the switch member 50 normally into contact with the second terminal member 24. For this purpose a suitable coiled torsion spring 60 may be mounted in the circumferential groove 45 of the stack of discs 40 with one end 61 (Fig. 2) of the spring in hooked engagement with the stack of discs and with the other end 62 in hooked engagement with the switch member 50. Thus, as viewed in Figs. 3 and 4, the torsion spring 60, which may be termed the third spring of the device, continuously urges the switch member 50 in a clockwise rotary direction. Since the switch member 50 is carried by the lamp cylinder 12, it is apparent that for the purpose of making a test the built-in switch mechanism may be operated simply by rotating the outer end of the lamp cylinder counterclockwise.

A feature of the described construction is the manner in which the three springs serve to eliminate backlash or looseness among the movable parts of the structural organization. The large spring 56 exerts a constant upward force to hold the lamp 13 firmly against the cap 16. The small spring 36, in pressing the plunger 35 against the base contact 28 of the lamp continuously urges the lamp cylinder 12 upward and thereby causes the toe 51 of the switch member 50 to press lightly against the upper wall of the circumferential groove 43 in the bank of discs 40. Thus the small spring 36 restrains longitudinal vibration of the lamp cylinder. Finally, the torsion spring 60, in continuously pressing the switch member 50 against the second terminal member 24 normally restrains the lamp cylinder against relative rotation.

It is contemplated that the outer end of the lamp cylinder 12 will be suitably insulated from the energizing circuits. For this purpose, the lamp cylinder 12 is embraced by an insulating sleeve 65 and is made in two fixedly telescoped parts which are insulated from each other by a concealed insulating sleeve 66.

The cylindrical housing 10 of the signal light may be adapted in any suitable manner for mounting in an aperture in an instrument panel with the outer end of the lamp cylinder 12 exposed for manual manipulation. For this purpose, the cylindrical housing 10 may be formed with external threads 67 by means of which the signal light may be mounted by a pair of nuts (not shown) in a well known manner.

In this particular embodiment of the invention the cap 16 is included in an assembly comprising a cylindrical shell 70 with a lower flange 71 and an upper flange 72; a bushing 73 threaded onto the upper end of the lamp cylinder 12; a lens or window 75 fixedly mounted on the shell 70; a ring 76 fixedly mounted against the inner face of the lens 75; and the two previously mentioned shutter members 14 and 15 which are adapted for actuation by rotation of the shell 70 of the cap relative to the lamp cylinder 12. Thus the bushing 73 and the ring 76 form a passage 80 for the emission of light through the lens 75 under the control of the two shutter members. The bushing 73 is in effect a removable part of the first cylindrical member. Preferably a ring-shaped leaf spring 79 is mounted between the lower end of the bushing 73 and the lower flange 71 of the shell 70 to create light pressure on the opposite faces of the two shutter members 14 and 15 for frictional retention of the two members at adjusted positions.

For the purpose of actuating the two shutter members 14 and 15, the bushing 73 has a pair of diametrically opposite recesses 81 and the ring 76, which together with the shell 70 is rotatable relative to the bushing, has a pair of diametrically opposite recesses 82. As indicated in Figs. 7 and 8, illustrating shutter member 14, each of the two shutter members has an upwardly turned operating tongue 83 and a down turned operating tongue 84. The two downwardly turned tongues 84 of the two operating members 14 and 15 respectively engage the two diametrical recesses 81 of the bushing 73, as shown in Fig. 1, and in like manner the upturned tongues 83 of the respective shutter members engage the diametrical recesses 82 of the ring 76. Thus, as may be understood by comparing Figs. 5 and 6, rotation of the cap 16 comprising the shell 70, the lens 75 and the ring 76 causes each of the two shutter members 14 and 15 to pivot about its downwardly turned tongue 84 in the corresponding fixed recess 81.

In the position of the cap 16 shown in Fig. 5, the two shutter members 14 and 15 are spaced apart to clear the light passage 80. Clockwise rotation of the cap 16 to the position shown in Fig. 6 closes the two shutter members together across the light passage, but each shutter member at its closed position co-operates with a corresponding arcuate edge 87 of the ring 76 to form a narrow arcuate slit 88. Thus a certain amount of indirect light will be emitted through the arcuate slits 88 at the closed position of the shutter members. Preferably the lens 75 will be colored to serve as a filter to modify the emitted light as desirable for night flying.

It will be noted in Figs. 5 and 6 that the ring 76 has two parallel straight inner edges 90, which together with the previously mentioned two arcuate edges 87 form an oblong central opening, which opening rotates between the two positions shown. The oblong opening is oriented to co-operate with the two shutter members to form the two slits 88 in the closed positions of the shutter members. It is important to note that rotation of the cap 16 counterclockwise from the position shown in Fig. 6 to the position shown in Fig. 5 for moving the two shutter members 14 and 15 to their maximum open positions is in the same rotary direction as required for moving the switch member 50 from its normal position against the second terminal member 24 (Figs. 3 and 4) to its test position against the third terminal member 25.

The operation and utility of the described signal lamp may be readily understood from the foregoing description. Fig. 9, in which the housing of the signal light is indicated by the dotted rectangle 10, shows how the three terminal members 23, 24 and 25 are connected with the wiring on an airplane. The first terminal member 23 is connected to the power source by a wire 93. The second terminal member 24 is connected to an indicating circuit 94, energized by the power source. The indicating circuit is controlled by a switch means 95 which normally determines whether or not the lamp bulb 13 is energized. The switch means 95 may, for example, close in response to lowering of the landing wheels. The third terminal member 25 is connected to a test circuit 96 which is also energized by the power source.

The cap 16 is normally adjusted at some point between the two extremes of the range of rotation represented by Figs. 5 and 6 thereby to dim the emitted light by at least partially closing the two shutter members 14 and 15. If there is any question about whether or not any failure of the lamp bulb 13 to light up as expected is caused by failure of the landing wheels to lower or is caused by failure of the lamp bulb itself, the cap 16 is manually rotated counterclockwise beyond the position shown in Fig. 5 to make a test. The initial counterclockwise rotation within the range represented by Figs. 5 and 6, opens the two shutter members 14 and 15 to the maximum as shown in Fig. 5, and at this limit position the two shutters become effective to operatively connect the cap 16 with the lamp cylinder 12 for counterclockwise rotation of the lamp cylinder. The continued counterclockwise rotation against the resistance of the torsion spring 60 carries the switch member 50 away from contact with the second terminal member 24 into contact with the third terminal member 25 to place the lamp bulb in the test circuit 96.

If the cap 16 is released with the switch member 50 in the test position, the torsion spring 60 will return the switch member to the normal position shown in Figs. 3 and 4 with the shutter members still wide open. The cap 16 may then be rotated clockwise for closing adjustment of the two shutter members as desired.

If the test reveals that the lamp 13 is burned out, the operator continues the counterclockwise rotation of the cap 16 beyond the limit position of the switch member 50 against the third contact member 25 to unscrew the bushing 73 from the lamp cylinder 12 for removal of the cap. When a new lamp bulb has been installed the cap is replaced.

The two shutters at their wide open positions operatively connect the cap 16 with the bushing 73 for counterclockwise rotation of the bushing and in like manner at their alternate limit closed positions operatively connect the cap with the bushing for clockwise rotation of the bushing. This fact together with the bias afforded by the spring 60 determines the order in which the three ranges of rotation occur. Thus in counterclockwise rotation of the cap 16 to carry out a test operation and continued to remove the cap, the ranges occur in the following order: (1) shutter-opening rotation of the cap relative to the bushing; (2) test-rotation of the lamp cylinder; and (3) unscrewing rotation of the cap relative to the lamp cylinder. The procedure of restoring the cap after replacement of the lamp bulb involves the following order: (1) spring 60 automatically reverses the test rotation of the lamp cylinder; (2) shutter-closing rotation of the cap is carried out to operatively connect the cap with the bushing; and (3) the cap screws the bushing onto the lamp cylinder. The cap is then reversed to open the shutter members as desired.

The cap is used, of course, to tighten the bushing into pressure abutment against the end of the lamp cylinder. It is apparent that the tightened engagement of the bushing with the threads of the lamp cylinder is relied upon to oppose the resistance of the torsion spring 60 in the test operation but nevertheless permits the cap 16 to be removed for lamp bulb replacement. Obviously, other expedients may be employed to provide releasable engagement of the bushing with the lamp cylinder for opposition to the torsion spring 60.

Our description in specific detail of the presently preferred embodiment of the invention for use on an aircraft will suggest to those skilled in the art various changes, substitutions and other departures from our disclosure that properly lie within the spirit and scope of the appended claims.

Having described our invention, we claim:

1. In a signal light of the character described for normal use with an indicating circuit and occasional use with a test circuit to check on the operating condition of the light, the combination of: a cylindrical housing having first, second and third terminals for connection, respectively, with a power source, the indicating circuit, and the test circuit; switch means in said housing for electrically connecting said first terminal with said second and third terminals selectively; a lamp in said housing; a first member operatively connected with said switch means and rotatably joined with said housing for rotation relative thereto between a normal limit position connecting said lamp to the indicating circuit and an alternate test position connecting said lamp to the test circuit; a spring urging said first member in one rotary direction to hold the first member yieldingly at said normal position; a second member rotatably joined with said first member for manual rotation relative thereto between a first limit position and a second limit posiiton; and shutter means operatively connected to said two members to progressively close in response to manual rotation of said second member in said one direction relative to said first member to reduce the amount of light released from said housing, whereby when said shutter is adjusted to reduce the released light, rotation of said second member in the direction opposite to said one rotary direction will first open the shutter to release maximum light and will then rotate said first member to its test position against the opposition of said spring.

2. A signal light as set forth in claim 1 in which said first member is rotatably telescoped into said housing and said second member is rotatably mounted on the other outer end of said first member.

3. A signal light as set forth in claim 2 in which said second member is a cap removably mounted on the outer end of said first member, said cap having a light-transmitting end wall.

4. A signal light as set forth in claim 3 in which said cap encloses a bushing mounted on said first member by screw threads and said shutter means is between the outer end of the first member and the cap.

5. A signal light as set forth in claim 4 in which said bushing has a surface for abutment against the outer end of said first member to permit the cap to be screwed onto the first member in one rotary direction with sufficient tightness to resist unscrewing when said cap is rotated in the opposite direction against the resistance of said spring.

6. In a signal light of the character described for normal use with an indicating circuit and occasional use with a test circuit to check on the operating condition of the light, the combination of: a housing; a hollow member mounted in said housing for manual rotation therein; a signal lamp in said hollow member, said lamp having two contacts; means including a first terminal carried by said housing to connect one of said lamp contacts with a power source for said two circuits; a second terminal carried by said housing for connection with said indicating circuit; a third terminal carried by said housing for connection with said test circuit; switch means in said housing operatively connected with said hollow member for actuation by rotation thereof between a normal position connecting the other lamp contact with said second terminal and a second position connecting said other lamp contact with said third terminal; and spring means to yieldably hold said switch means at its normal position.

7. In a signal light of the character described for normal use with an indicating circuit and occasional use with a test circuit to check on the operating condition of the light, the combination of: a cylindrical housing; a cylindrical member mounted in said housing for manual rotation therein; a lamp mounted in said cylindrical member, said lamp having two contacts; a first terminal carried by said housing for connection with a power source for said two circuits; conducting means extending from said terminal into said housing to one of said contacts of the lamp; a second terminal carried by said housing for connection with an indicating circuit; a third terminal carried by said housing for connection with a test circuit; a switch member carried by said cylindrical member for movement in a circular path by rotation of the cylindrical member, said switch member being connected with the other lamp contact; conducting means unitary with said second terminal and extending into said path to contact said switch member to limit rotation of the cylindrical member in one direction and to connect said other lamp contact electrically with said second terminal; conducting means unitary with said third terminal and extending into said path to contact said switch member to limit rotation of the cylindrical member in the other direction and to connect said other lamp contact electrically with said third terminal; and a spring yieldably urging said cylindrical member in the rotary direction to hold said switch member against the first-mentioned conducting means whereby said lamp is normally in an indicating circuit and whereby said cylindrical member may be manually rotated against the opposition of said spring to connect said lamp into a test circuit.

8. In a signal light of the character described for normal use with an indicating circuit and occasional use with a test circuit to check on the operating condition of the light, the combination of: a housing; a hollow member mounted in said housing for manual rotation therein; a signal lamp in said hollow member, said lamp having two contacts; a first terminal carried by said housing for connection with a power source for said two circuits; means including a plunger slidably mounted in said housing to connect said terminal electrically with one of said lamp contacts; a second terminal carried by said housing for connection with an indicating circuit; a third terminal carried by said housing for connection with a test circuit; switch means in said housing including a switch member carried by said hollow member for electrical connection with said second terminal at one rotary position of the hollow member and electrical connection with said third terminal at a second rotary position of the hollow member; a first spring to urge said plunger against said one lamp contact; a second spring to electrically connect the other lamp contact with said switch member; and a third spring to yieldingly hold said hollow member at said one rotary position.

9. In a signal light of the character described for normal use with an indicating circuit and occasional use with a test circuit to check on the operating condition of the light, the combination of: a cylindrical housing; a first terminal carried by said housing for connection with a power source for said two circuits; a cylindrical member mounted in said housing with one end extending out of the top of the housing to permit manual rotation of the member, said member having an inner shoulder and a downwardly extending switch portion; a second terminal carried by said housing for connection with an indicating circuit, said second terminal having a portion positioned to contact said switch portion at a normal rotary position of said cylindrical member; a third terminal carried by said housing for connection with a test circuit, said third terminal having a portion positioned to contact said switch portion at a second rotary position of said cylindrical member; means including a first spring to maintain one of said lamp contacts in electrical connection with said first terminal; means including a second spring in compression against said shoulder to maintain the other lamp contact in electrical communication with said cylindrical member; and a third spring to yieldingly hold said cylindrical member at its rotary position with said switch portion in contact with said portion of the second terminal.

10. In a signal light of the character described for normal use with an indicating circuit and occasional use with a test circuit to check on the operating condition of the light, the combination of: a cylindrical housing; a cylindrical member with its inner end rotatably telescoped into the upper end of said housing; a lamp mounted in said cylindrical member, said lamp having two contacts; a sleeve of conducting material mounted in the lower end of said housing; a first terminal connected with said sleeve for connection with a power source; a spring-pressed plunger slidably mounted in said sleeve to connect said terminal electrically with one of said lamp contacts; non-conducting material surrounding said sleeve; a second terminal in engagement with said nonconducting material for connection with an indicating circuit; a third terminal in engagement with said nonconducting material for connection with a test circuit; a switch member carried by said cylindrical member for movement by rotation thereof between a normal position abutting said second terminal and an alternate position abutting said third terminal; and a spring yieldably holding said switch member at its normal position.

11. In a signal light of the character described for normal use with an indicating circuit and occasional use with a test circuit to check on the operating condition of the light, the combination of: a housing; a hollow member rotatably mounted in said housing for rotation between a first normal rotary position and a second rotary position; a rotary operating member to rotate said hollow member, at least a portion of said operating member being exposed outside said housing for manual rotation thereof, said operating member having a lost-motion connection with said hollow member to permit a range of relative rotation between the two members; a signal lamp in said hollow member, said lamp having two contacts; means including a first terminal carried by said housing to connect one of said lamp contacts with a power source for said two circuits; a second terminal carried by said housing for connection with said indicating circuit; a third terminal carried by said housing for connection with said test circuit; switch means in said housing operatively connected with said hollow member for actuation by rotation thereof between a normal position connecting the other lamp contact with said second terminal and a second position connecting said other lamp contact with said third terminal; a spring to yieldably hold said hollow member at said normal rotary position with said switch in its normal position for connecting said lamp with the indicating circuit whereby said hollow member may be rotated in one rotary direction from said normal position to said second position in opposition to said spring thereby to move said switch member to said test position; and shutter means for said lamp operatively connected with said hollow member and said operating member for progressively closing movement to progressively cut off light from said lamp in response to rotation of said operating member relative to said hollow member in the direction opposite to said one rotary direction, whereby manual rotation of the operating member in said one direction will first open said shutter for maximum release of light from said lamp and will then rotate said hollow member in opposition to said spring to connect the lamp with the test circuit.

12. In a signal light of the character described for normal use with an indicating circuit and occasional use with a test circuit to check on the operating condition of the light, the combination of: a housing having first, second and third terminals for connection, respectively, with a power source, the indicating circuit, and the test circuit; a lamp in said housing; switch means in said housing having a normal position connecting said first terminal with said second terminal through the lamp and a test position connecting the first terminal with the third terminal through the lamp; a first hollow member operatively connected with said switch means and mounted on said housing for movement relative thereto through a switch-operating range of rotation to move said switch means from its normal position to its test position; spring means to hold said switch means at its normal position thereby holding said first member at one end of said range of rotation; shutter means adjustable to reduce the illumination emitted by the signal light; and a second operating member mounted on said first member for movement relative thereto through a range of rotation to adjust said shutter means, said second member being limited to said adjustment range of rotation relative to said first member whereby at the end of said adjustment range the second member is operatively connected to the first member for rotation of the first member.

13. A signal light as set forth in claim 12 in which said second member rotates in the same rotary direction to open said shutter means and to operate said switch means in opposition to said spring means whereby said switch means may be moved to its test position only when the shutter means is wide open.

14. In a signal light of the character described for normal use with an indicating circuit and occasional use with a test circuit to check on the operating condition of the light, the combination of: a housing having first, second and third terminals for connection, respectively, with a power source, the indicating circuit, and the test circuit; a lamp in said housing; switch means in said housing having a normal position connecting said first terminal with said second terminal through the lamp and a test position connecting the first terminal with the third terminal through the lamp; a first hollow member operatively connected with said switch means and mounted on said housing for limited counterclockwise rotation relative thereto through a switch-operating range to shift said switch means to its test position; spring means to yieldably urge said first member in a clockwise direction and to yieldingly hold said switch means at its normal position; means threaded clockwise on said first member with sufficient tightness to resist said yielding means, said threaded means being removable by counterclockwise rotation for access to the interior of the signal light; shutter means adjustable to reduce the illumination emitted by the signal light; and a second operating member mounted on said threaded means for limited clockwise rotation relative thereto through a shutter-operating range to progressively close said shutter means to reduce the emitted illumination, whereby with said shutter means adjusted at a position for reduced illumination continuous counterclockwise rotation of the operating member will include an initial range of rotation to open said shutter means to the maximum, a successive intermediate range of rotation to move said switch means to its test position, and finally a third range of rotation to unscrew said threaded means from said second member.

References Cited in the file of this patent
UNITED STATES PATENTS

| Number | Name | Date |
|---|---|---|
| 2,144,137 | Batcheller | Jan. 17, 1939 |
| 2,165,199 | Batcheller | July 11, 1939 |
| 2,308,882 | Johnson | Jan. 19, 1943 |
| 2,424,574 | Marco | July 29, 1947 |
| 2,424,575 | Aves | July 29, 1947 |
| 2,593,784 | Nyberg | Apr. 22, 1952 |